United States Patent
Dennis et al.

[15] 3,683,404
[45] Aug. 8, 1972
:::

[54] MULTI CHANNEL MONITORING AND PRINTING RECORDER APPARATUS

[72] Inventors: John D. Dennis, Fort Worth; James M. Winkler, Burleson, both of Tex.

[73] Assignee: Westronics, Inc., Ft. Worth, Tex.

[22] Filed: June 12, 1970

[21] Appl. No.: 45,796

[52] U.S. Cl. .................................................. 346/34
[51] Int. Cl. ............................................. G01d 9/34
[58] Field of Search ......................................... 346/34

[56] References Cited

UNITED STATES PATENTS

| | | | |
|---|---|---|---|
| 3,034,125 | 5/1962 | Gonzenbach | 346/34 X |
| 3,189,910 | 6/1965 | Blakeslee | 346/34 X |
| 3,303,509 | 2/1967 | Smith | 346/34 |
| 3,316,554 | 4/1967 | Parker et al. | 346/34 |

*Primary Examiner*—Joseph W. Hartary
*Attorney*—Wofford and Felsman

[57] ABSTRACT

A multi point recorder having a plurality of input terminals; selector switch for monitoring respective ones of the input terminals; indexing assembly for simultaneously and synchronously indexing the selector switch and a print head; measuring circuit; positioning apparatus for positioning the print head in accordance with the measured magnitude; and characterized by a plurality of bypass switches; a bypass deck connected with the selector switch so as to track synchronously therewith; a scan timer for generating periodically a signal that will initiate a print and index operation; a desensitizer circuit and a print signal generator circuit connected serially with the scan timer for stopping the positioning apparatus and effecting a printing by the print head; and an indexing signal generator circuit for also controlling the desensitizing and the indexing to the next input terminal that is not to be bypassed, and then allowing positioning and timing. Also disclosed is a preferred embodiment in which a channel indicator is remotely mounted so as to be readily visible, the indicator being positively and synchronously connected with both the selector switch and the print head.

7 Claims, 3 Drawing Figures

United States Patent
Dennis et al.
[15] 3,683,404
[45] Aug. 8, 1972
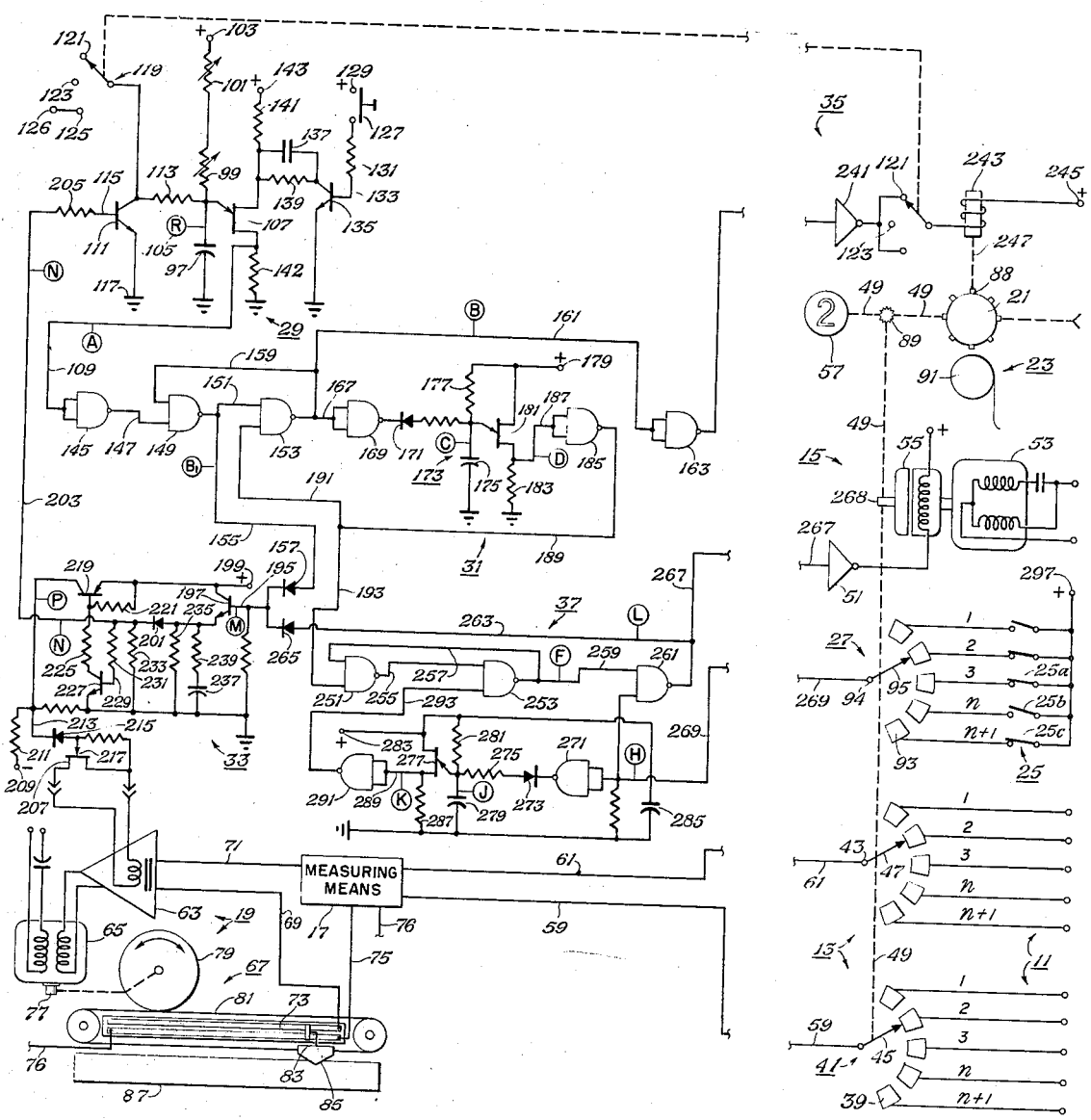

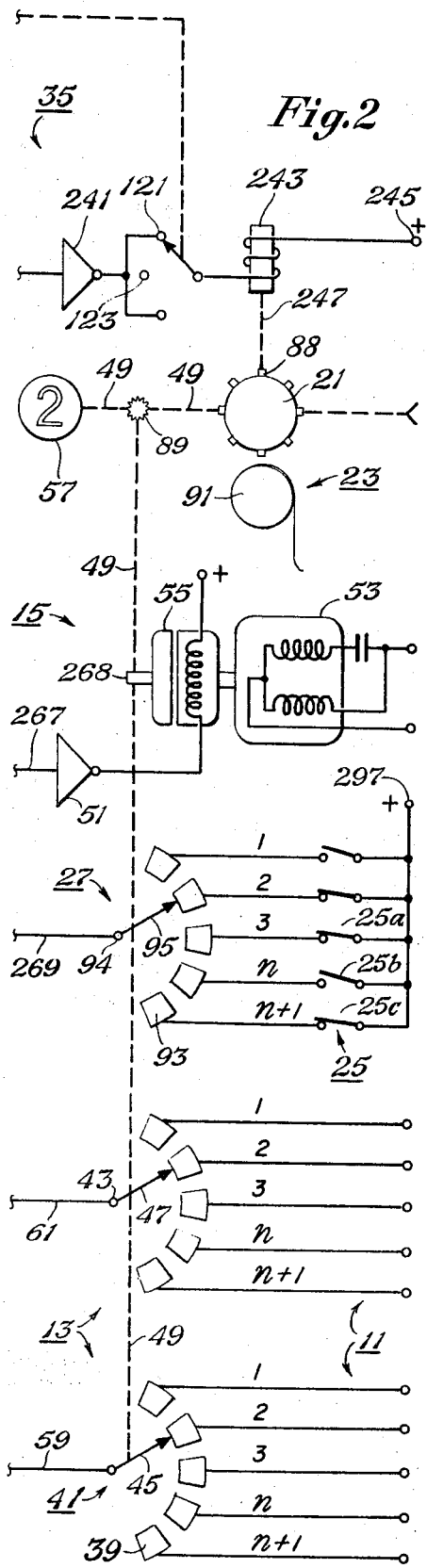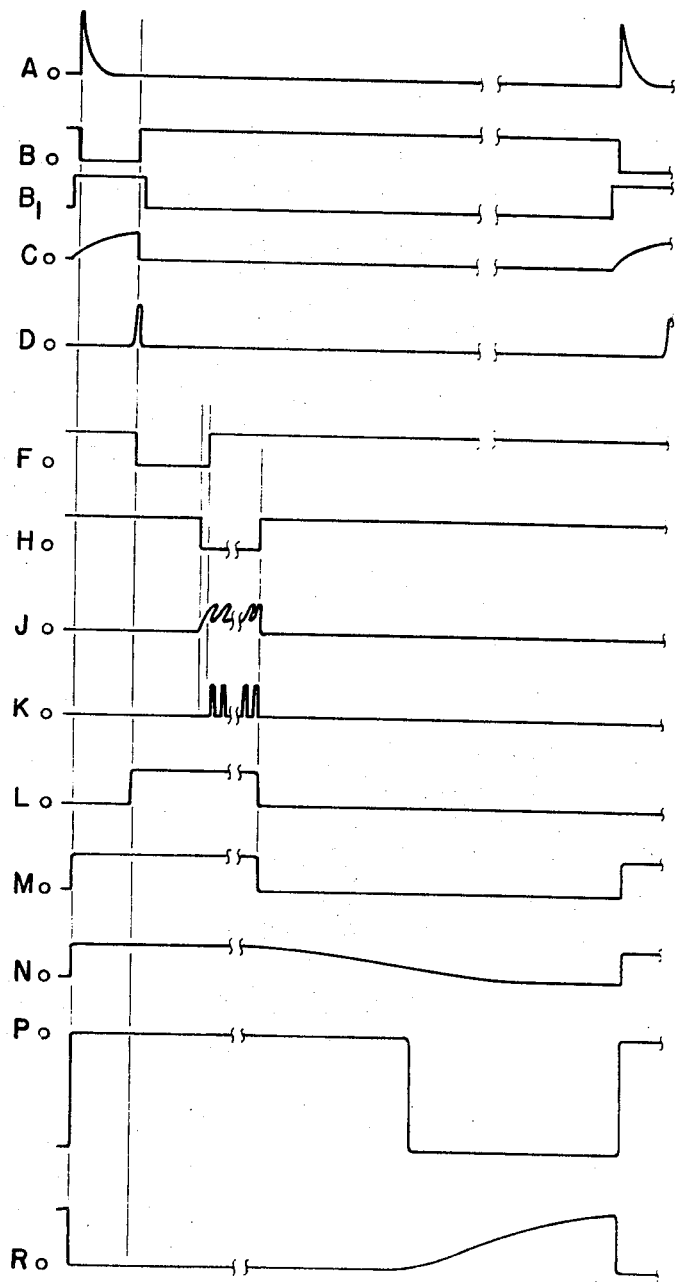
Fig. 2
Fig. 3
INVENTORS
John L. Dennis
James M. Winkler
BY
Wofford & Felsman
ATTORNEYS

MULTI CHANNEL MONITORING AND PRINTING RECORDER APPARATUS

BACKGROUND OF THE INVENTION

1. Field of the Invention

This invention relates to recorder apparatus, and more particularly to recorder apparatus wherein information, intelligence, or data derived from a plurality of input channels is recorded on a single moving chart. This invention is especially applicable to, but not restricted to, recorders of the null-balance potentiometer type having a single recording head, or print head, shared by a plurality of input channels with the print head printing signal information from each input channel, or from selected input channels in accordance with a selected sequence or predetermined program.

2. Description of the Prior Art

Several varieties of multi channel printing recorders have been available in the prior art. While these prior art multi channel printing recorders represented an improvement over having to have individual recorders for each channel, they still suffered from several drawbacks, or disadvantages. The multi channel printing recorders of the prior art were complex pieces of apparatus having a multiplicity of mechanical parts that decreased reliability, increased maintainence, and made miniaturization difficult and impractical.

Moreover, the prior art printing recorders were too slow in their completing a scan cycle since they did not have a rapid bypass capability but required waiting out differential time periods for respective channels; and they did not enable controlling the channels being monitored or bypassed from a position remote from the recorder.

Also, the prior art printing recorders did not have a channel indicator that was remote from the print head and easily visible from a selected location without having to pull the recorder and look at the print head.

Thus, it can be seen that the printing recorders of the prior art were not totally satisfactory in solving today's needs.

BRIEF DESCRIPTION OF THE DRAWINGS

FIGS. 1 and 2 are a unitary schematic drawing of one embodiment of this invention.

FIG. 3 is a drawing of the signals effected at indicated points in the electrical schematic of FIGS. 1 and 2.

DESCRIPTION OF THE PREFERRED EMBODIMENT(S)

Figure 1:
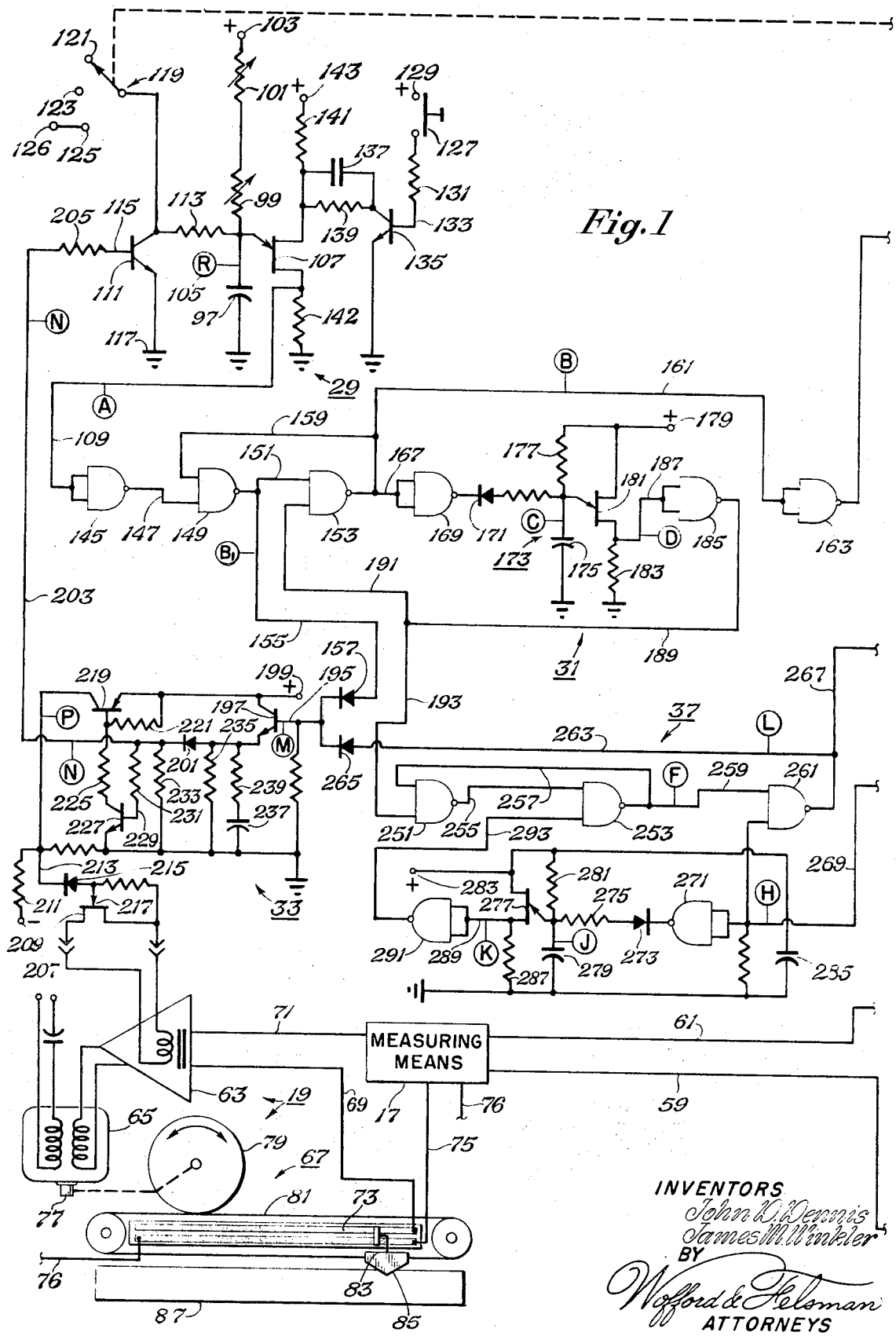

It is a primary object of this invention to provide a multi channel printing recorder apparatus employing a uniquely advantageous combination of electrical, electronic, and mechanical elements that effects a simple recorder with a minimum of parts, thus achieving a high degree of reliability with low maintainence and facilitating miniaturization into a compact unit.

It is also an object of this invention to provide a multi channel printing recorder that has improved high-speed capability in that it can complete a scan cycle through a plurality of input channels more rapidly than any of the prior art devices. It is a specific object of this invention to provide, in this aspect, a multi point recorder that enables controlling the channels that will be monitored or bypassed from a remote position and rapidly bypassing those channels that are to be bypassed without requiring a waiting time before proceeding to the next channel.

Furthermore, it is an object of this invention to provide a multi channel printing recorder that has a channel indicator that is remote from the print head and that is readily visible from a selected location but is positively synchronized with the print head and the selector switch.

Referring to the figures, FIGS. 1 and 2 illustrate a multi channel printing recorder apparatus of the same general type as described in U. S. Pat. No. 3,148,014, entitled "Multi Channel Printing Recorder Apparatus", David W. King, Jr. and Frederick L. Maltby. The multi channel printing recorder has a frame or chassis (not shown) for supporting the respective elements. Such chassis are well known and do not form a part of the present invention.

The major and significant elements of the multi channel printing recorder are input terminals 11, selector switch means 13, indexing means 15, measuring means 17, positioning means 19, print head 21, chart and chart drive assembly 23, bypass switch means 25, bypass deck means 27, scan timer means 29, print signal generator means 31, desensitizer means 33, print means 35, and index signal generator means 37.

The plurality of input terminals 11 comprise matched pairs of input channels as indicated by the numbers 1, 2, 3, $n$, and $n+1$, attached to respective contacts 39 on the selector switch means 13. For example, selector switch means 13 may comprise a pair of decks 41 and 43 having matched sets of contacts. The respective decks 41 and 43 may have respective wiper arms 45 and 47 that are mechanically connected together, as indicated by dashed lines 49 so as to move synchronously to the respective pairs of contacts. On the other hand, any switch means could be employed as selector switch means 13, if it would connect the respective input channels into measuring means 17. As shown, however, the wiper arms serve to connect each respective contact with a respective output terminal on each of the decks 41 and 43 in response to urging and movement by the indexing means 15.

The indexing means 15 comprises an index amplifier 51, an index motor 53, and an index clutch 55. Index amplifier 51 is a Darlington amplifier although any satisfactory amplifier could be employed to take the indexing signal from the index signal generator means 37 and energize index clutch 55. Index motor 53 is a continuously running motor. The index clutch 55 is employed to provide substantially instantaneous stopping and starting of respective elements being indexed, and prevent overrunning because of the inertia of the index motor 53. Specifically, index clutch 55 is immediately energized by the output of index amplifier 51 and immediately deenergized such that there is effectively no overrun of the various elements such as selector switch means 13 mechanically coupled thereto. As indicated by the dashed line 49 several elements are positively coupled to the indexing means; for example, in addition to the selector switch means 13, the bypass deck means 27, the spline shaft 89, indexing print head 21 and channel indicator 57 are all positively coupled to the indexing means.

The measuring means 17 may be of any conventional type commonly employed in multi point recorders. For example, it may be the null-balance type potentiometer circuits employing the feedback from a rheostat. The measuring means 17 do not per se form part of the present invention and are not shown and described in detail herein. The measuring means 17 are connected via appropriate conductors 59 and 61 with the respective output terminals on decks 41 and 43 to detect and measure the signal present on a selected channel, or pair of input terminals.

The positioning means 19 is connected with the measuring means 17 and is operable to position the print head and associated equipment with respect to the lateral axis of the chart at a position corresponding to the magnitude of the parameter being measured, or the signal on the selected channel. Specifically, the positioning means 19 comprises servo amplifier 63, servo motor 65 and carriage track and slide wire rheostat 67. The servo amplifier 63 is connected with the measuring means 17 via conductor 71 and via conductor 69, slide wire rheostat 73, and conductors 75 and 76 (indicated by discontinuous line). The servo amplifier 63 responds to the differential voltage output from measuring means 17, the differential voltage also being responsive to the position of carriage 85 along slide wire rheostat 73. The servo amplifier drives the reference winding of the servo motor 65 and effects positioning of the carriage 85 at a null point where the differential voltage is reduced to zero. The servo motor is of a conventional type commonly employed with null-balance type potentiometer recorders such that output from its shaft 77 ultimately drives bull wheel 79. The bull wheel 79 is connected via drive string 81 with the carriage 83 carrying pointer 85 and print head 21. The pointer 85 facilitates visual observation of the relative position of the print head along a scale 87 that is ordinarily calibrated between 0 and 100 percent. Such a positioning means is described in detail in the previously cited U.S. Pat. No. 3,148,014.

The print head 21 may be any of the conventional print heads employed in the multi channel printing recorder apparatus. Print head 21 is positively coupled with spline shaft 89 and slidable therealong to insure that it is indexed synchronously with the selector switch means 13 to always indicate the proper channel. The print head 21 has in association therewith the usual protruding stubs 88 containing symbols or numbers identifying the respective channel being monitored; and the inking pads necessary to keep the respective stubs 88 inked for printing. Print head 21 may be carried within carriage 83 by any suitable arrangement such as a pivotal print head actuator bar of right angle transverse section which is pivotally suspended by a pair of integral support arms such that when the free end of the bar is drawn toward a print solenoid, print head 21 is depressed downward to print the symbol on the paper riding on top of print platen 91.

The chart and chart drive assembly 23 per se form no part of this invention, and so are not shown or described in detail herein. As is well known, the chart paper is feed from a supply roll that is journalled to the side walls at the front center portion, upward and over a print platen 91. The print platen 91 is driven at a selected constant rate through a gear train by a conventional motor (not shown). The print paper is driven by the usual radial projections on the print platen end portions which cooperate with marginal lines of spaced holes in the chart paper. A backup rod is fixed to extend parallel to the print platen 9 adjacent its lower rear surface to keep the chart paper snug against the print platen.

The bypass switch means 25 comprise a plurality of bypass switches, one corresponding to each respective input channel for indicating whether that respective input channel is to be monitored or bypassed. As illustrated, the bypass switches 25 are connected with respective contacts of the bypass deck means 27. The bypass switches are included in a separable unit, however, so that they can be positioned remote from the recorder if it is desired to control which channels are to be monitored on given cycles from the remote position.

The bypass deck means 27 has a plurality of contacts 93 that are connected, as indicated, with the respective bypass switches. It also has an output terminal 94 and an interconnection means for connecting the output terminal 94 with the respective contact 93 corresponding to the input channel to which the selector switch means 13 is being indexed by the indexing means 15. The interconnection means is illustrated as a wiper arm 95. The interconnection means could comprise electronic means such as ring counters, or solid state devices to track synchronously with the selector switch means 13 so as to connect a respective and corresponding bypass switch 25 with the output terminal 94.

The scan timer means 29 is provided for generating periodic signals, each periodic signal initiating a print and index operation. The scan timer 29 includes an electronic timer comprising the RC network of capacitor 97 and variable resistors 99 and 101 serially connected with a power source 103. Capacitor 97 is chargeable by the signal R, as indicated in the circle 105 and illustrated as signal R, FIG. 3, at a speed determined by the value set into resistors 99 and 101. The max rate resistor 99 may be adjusted to adjust the maximum rate at which the scan timer will time out when not otherwise inhibited. It has been found desirable to adjust this to effect a timing rate of between 1 and 5 seconds. Similarly, the scan rate resistor 101 may be set to further adjust the duration of the time it takes to charge capacitor 97. It has been found that the scan rate resistor 101 may be operable to extend the range over about 45 seconds such that the time may be adjusted between about 1 and about 50 seconds. Power source 103 may be any source of power compatible with the circuitry. For example, a positive 18 volt power source has been found to be satisfactory. Capacitor 97 is connected with unijunction transistor 107 so that when capacitor 97 charges to a predetermined voltage the unijunction transistor 107 will fire to discharge capacitor 97 and effect periodic pulse A. Conductor 109 is connected with the unijunction transistor 107 and with the print signal generator means 31, for carrying the periodic pulse A to the latter. Specifically, unijunction transistor 107 is serially connected via resistors 141 and 142 with power source 143 and common and has its emitter connected with the juncture of capacitor 97 and max rate resistor 99. The juncture of one of the base legs of the unijunction transistor 107 and the resistor 142 is connected via conductor 109 with the input terminal of inverter logic element 145.

The scan timer 29 has an inhibit transistor 111 that will prevent capacitor 97 from charging via current limiting resistor 113 when its base 115 is suitably biased. The inhibit transistor 111 has its emitter and collector serially connected with a ground, or common, 117 and with a mode switch 119. The mode switch 119 allows the recorder to be operated in the normal print mode when connected with "print" terminal 121; allows it to merely scan without printing when connected with "scan" terminal 123, and allows indication only, when contacted with "indicate" terminal 125. In the "indicate" position, the recorder is connected with power source 126 that prevents generation of a periodic signal A and locks the recorder in on one channel so it does not scan all of the channels as it does in the scan or in the print mode. A manual advance is provided by manual switch 127. Specifically, manual switch 127 is connected with power source 129 and via resistor 131 with the base 133 of transistor 135. Transistor 135 has its base and emitter serially connected with the junction of capacitor 137 and current limiting resistor 139 and with ground. The other juncture of capacitor 137 and resistor 139 are connected with the juncture of unijunction transistor 107 and resistor 141, serially connected with power source 143. Thus, when base 133 is suitably biased as by manual closing of switch 127, transistor 135 discharges capacitor 137 to ground and artificially creates pulse A to advance the indexing means to the next channel to be monitored.

The print signal generator means 31 is connected with the scan timer means 29 for generating, in response to the respective periodic signals A, a desensitize signal; a print signal; and, after a time interval, a set-reset signal. Specifically, conductor 109 is connected with both input terminals of inverter logic element 145. The output terminal of inverter logic element 145 is connected via conductor 147 with one input terminal of inverter logic element 149. The output terminal of inverter logic element 149 is connected via conductor 151 with one input terminal of inverter logic element 153. The output terminal of inverter logic element 149 is also connected via conductor 155 and diode 157 with the desensitizer means 33. The output terminal of inverter logic element 153 is connected via conductor 159 with the other input terminal of inverter logic element 149 to form a bistable latch arrangement. The output terminal of inverter logic element 153 is also connected via conductor 161 with inverter logic element 163 for generating a print signal. The output terminal from inverter logic element 153 is also connected via conductor 167 with inverter logic element 169 for initiating a timing cycle that will ultimately culminate in a set-reset pulse. The output terminal of inverter logic element 169 is connected through diode 171 with a timing means 173. The timing means comprises a timing capacitor 175 and a resistor 177 connected in series with ground and with a power source 179. Unijunction transistor 181 is serially connected with power source 179, resistor 183, and ground and has its emitter connected with the juncture of resistor 177 and capacitor 175 in the timing RC network. The juncture of one of the base legs of unijunction transistor 181 and resistor 183 is connected with the input terminals of logic element 185. Thus, when timing capacitor 175 is charged to a predetermined voltage, the unijunction transistor 181 will be rendered conductive for effecting a signal, or pulse, D on conductor 187. The output terminal of inverter logic element 185 is connected via conductors 189 and 191 with the input terminal of inverter logic element 153 to reset it and ready the bistable latch to receive another pulse. The output terminal of inverter logic element 185 is also connected via conductors 189 and 193 with the index signal generator means 37.

The desensitizer means 33 is connected with the print signal generator means 31 and the positioning means for desensitizing and stopping the positioning means in response to a desensitize signal. As illustrated, the desensitizer means 33 is also connected with the scan timer means so as to inhibit the beginning of the timing period as long as a desensitize signal is being sent to the desensitizer means. Specifically, base 195 of transistor 197 is serially connected with diode 157 so as to be rendered conductive by a desensitize signal. Transistor 197 is serially connected with power source 199 and via diode 201, conductor 203 and resistor 205 with base 115 of inhibit transistor 111 for rendering inhibit transistor 111 conductive when a desensitize signal is sent to the desensitizer means 33.

In the desensitizer means 33 a field effect transistor 207 is normally maintained non-conducting by the presence of a negative voltage from power source 209 that is connected via resistor 211, conductor 213, and diode 215 to the gate 217 of field effect transistor 207. When the field effect transistor 207 is allowed to become conductive, it serves to short out a secondary winding of a transformer in the servo amplifier 63 and in effect brings the reference winding of the servo motor 65 to zero, preventing movement of the bull wheel and, consequently, carriage 83. It is allowed to become conductive through interconnection with transistor 197. Specifically, the juncture of resistor 211 and diode 215 is connected with the collector of transistor 197 via transistor 219. Resistor 221 biases the base 223 of transistor 219 for maintaining transistor 219 conductive and bringing the negative bias on the field effect transistor 207 to zero when a desensitize signal is sent to base 195 of transistor 197 to render it conductive. The base 223 is also serially connected via resistor 225 and transistor 227 with ground. The base 229 of transistor 227 is connected via biasing resistor 231 with the juncture of diode 201 and resistor 205. Current limiting resistor 233 is serially connected with the juncture of diode 210 and resistor 205 and with ground. Current limiting resistor 235 is serially connected with the juncture of diode 201 and the emitter of transistor 197 and with ground.

The desensitizer means also has a desensitizing timer means internally that comprises the RC network of the filter capacitor 237 and resistor 239. The desensitizing timer means serves to continue the desensitizing and the stopping of the positioning means for a predetermined interval of time after discontinuance of a desensitize signal. The predetermined interval of time is, of course, controlled by the values of the capacitor and the resistor in the RC network. This desensitizing timer means has been found helpful in eliminating hunting of the positioning means in response to the measuring means sensing decaying transients due to switching on and off of clutches, switches, and the like. Because of the delay effected by the desensitizing timer means, the transients decay and the measuring means 17 will sense only the value of the parameter being measured and eliminate such hunting of the positioning means in positioning the print head.

A print means 35 is connected with the print signal generator means 31 and is operable to effect printing via the print head 21 in response to the print signal. Specifically, the print means comprises print amplifier 241 and print solenoid 243. Print amplifier 241 may be any conventional amplifier that will effect the desired degree of amplification of the print signal so as to activate print solenoid 243. As illustrated, print amplifier 241 is a Darlington amplifier of the same type as index amplifier 51. Any solenoid may be employed as print solenoid 243 as long as it is capable of effecting printing of the print head 21 in response to the amplified print signal from print amplifier 241. As illustrated, the print solenoid 243 is serially connected with a power source 245 such as a positive 36 volts and with the output of amplifier 241. Intermediate print amplifier 241 and print solenoid 243 is one branch of mode switch 119. When connected with the print terminal 121, as illustrated, the normal print operation is effected. As can be seen, when connected in the scan position 123, however, there is no interconnection between the print amplifier and the print solenoid so there is no printing operation, although otherwise the same scanning is effected. The interconnection between print solenoid 243 and print head 21, symbolized by dashed line 247 is, in fact, a periodic electromagnetic coupling between print solenoid 243 and a right angle actuator bar which pivotally carries print head 21, as described hereinbefore. The bar is pulled toward print solenoid 243, effecting a downward movement of print head 21 to print a given symbol onto the paper over print platen 91.

The index signal generator means 37 is connected with the print signal generator means 31 via conductor 193 for generating, in response to the set-reset signal, a continuing desensitize signal and an indexing signal. The index signal generator means 37 is connected with the desensitizer means 33 for transmitting thereto the continuing desensitize signal. The index signal generator means is also connected with the indexing means for transmitting thereto the indexing signal. The indexing signal effects indexing of the selector switch and the bypass deck means to the next terminal that is not to be bypassed. For determining when the next terminal or contact not to be bypassed is encountered, the indexing signal generator means is also connected with the output terminal of the bypass deck means 27 for stopping the indexing and terminating the continuing desensitize signal in response to being connected with a properly positioned bypass switch; that is, either a closed bypass switch 25 with the type logic circuit illustrated, or an open bypass switch with another type of logic circuit.

Specifically, conductor 193 is connected with one input terminal of inverter logic element 251. The output terminal of inverter logic element 251 is connected with inverter logic element 253 by a conductor 255. The output terminal of inverter logic element 253 is connected back with the other input terminal of inverter logic element 251 by conductor 257 to form a bistable latch arrangement. The bistable latch arrangement is a safety factor that prevents inadvertant and inappropriate operation of the logic elements in response to transients and will not accept another signal on conductor 193 until the bistable latch is reset. The output terminal of inverter logic element 253 is also connected via conductor 259 with one input terminal of inverter logic element 261. The output terminal of inverter logic element 261 is connected via conductor 263 and diode 265 with the base 195 of transistor 197 in the desensitizer means 33; and via conductor 267 with index amplifier 51.

The output terminal 94 of bypass deck means 27 is connected via conductor 269 with the other input terminal of inverter logic element 261 and with both input terminals of inverter logic element 271. The purpose of this interconnection is to drive or keep the output terminals of inverter logic elements 261 and 271 high when the wiper arm 95 moves off a given contact to maintain the continuing desensitize signal and the indexing signal and to start a reset timer means that will effect a resetting of the bistable latch comprising interconnected inverter logic elements 251 and 253. The output terminal of inverter logic element 271 is connected via diode 273 and resistor 275 with the juncture of the emitter of unijunction transistor 277, timing capacitor 279 and timing resistor 281. The timing capacitor 279 and timing resistor 281 are serially connected with ground and with a power source 283. Connected in parallel with the timing capacitor 279 and timing resistor 281 and in series with power source 283 and ground is supressor capacitor 285 for suppressing transient spikes that may occur in the power source because of the switching, engaging of clutches, starting of motors and the like. The unijunction transistor 277 and current limiting resistor 287 are also serially connected with power source 283 and with ground, as well as timing capacitor 279. Unijunction transistor 277 is thus operative to discharge timing capacitor 279 at a predetermined voltage. The juncture of unijunction transistor 277 and current limiting resistor 287 is connected via conductor 289 with the input terminals of inverter logic element 291. The output terminal of inverter logic element 291 is connected via conductor 293 with the other input terminal of inverter logic element 253 for effecting a reset of the bistable latch.

OPERATION

In operation, the selector switch means will have selected an input channel such as channel 2 through movement of the indexing means onto the contact 93 connected with closed bypass switch 25. The channel indicator 57 will indicate to the viewer at a selected location that channel 2 is being monitored. The magnitude of the parameter being monitored will be indicated by recorder input signal sent via conductors 59 and 61 to the measuring means 17. The measuring means 17 will measure the magnitude of the input signal and via output on conductors 69 and 71 send an error input signal to the servo amplifier 63 which will drive the reference winding of servo motor 65 to a desired value. Output shaft 77 of the servo motor 65 will turn bull wheel 79 in the indicated direction. The bull wheel 79, having drive string 81 wrapped therearound will thus position carriage 83 carrying the pointer 85 and the print head 21 to position it as indicated by the output from the servo amplifier 63. As the carriage 83 is moved, it moves a contact arm along slide wire rheostat 73, which effects a change in sensed voltage to drive the error signal to zero. Thus, in essence the measuring means compares the voltage versus the magnitude of the input signal and sends an error input signal to the servo amplifier 63 until a null is effected by balancing of the voltages. Ideally, further movement of the carriage 83 would be prevented unless the value of the parameter changed.

At an appropriate time, determined in part by the periodic interval set by max rate resistor 99 and scan rate resistor 101 and the magnitude of the timing capacitor 97, unijunction transistor 107 fires and generates pulse A, FIG. 3. Pulse A is transmitted via conductor 109 to drive the output terminal of inverter logic element 145 low; in turn driving the output of inverter logic element 149 high. This high signal is the $B_1$ signal which is carried by conductor 155 through diode 157 to generate the signal M on the base 195 of the transistor 197 in the desensitizer means 33.

Before the printing by print head 21, the desensitizer means 33 will effect, in response to a desensitize pulse M a desensitizing of the positioning means to prevent movement of the print head during the printing operation, thereby preventing smearing or the like. Specifically, as indicated hereinbefore, a desensitize signal M effects conduction of transistor 197, altering the field gate 217 of field effect transistor 207 from its negatively biased condition preventing conduction of the field effect transistor to essentially zero, allowing conduction of the field effect transistor. As indicated, the field effect transistor thus shorts out the secondary coil in the servo amplifier 63 to effectively cut off all signals to the motor by bringing the reference winding of the servo motor 65 to zero. Thus, movement of the carriage 83 is prevented during the existence of a desensitize signal M on the base 195 of transistor 197.

Moreover, the conduction of transistor 197 effects a signal N on conductor 203 biasing the base 115 of inhibit transistor 111. Thus, the inhibit transistor 111 prevents the charging of timing capacitor 97 as long as a desensitize signal M maintains transistor 197 conductive.

The high signal on inverter logic element 149 also drives the output terminal of inverter logic element 153 low. The low is transmitted, or is carried, via conductor 159 to the other input terminal of inverter logic element 149 and maintains the bistable latch in the present condition, despite the fact that the signal A will decay and allow the output terminal of inverter logic element 145 to go high. The low signal at the output terminal of the inverter logic element 153 is also the signal B which is carried via conductor 161 to the inverter logic element 163, driving the output terminal of inverter logic element 163 high and effecting a print signal. The print signal is carried via print amplifier 241 to print solenoid 243 to effect printing via print head 21. The print head 21 will have been synchronously indexed so as to print the number 2, or any symbol corresponding to channel number 2.

The signal B on the output terminal of inverter logic element 153 also drives the output terminal of inverter logic element 169 high to start charging timing capacitor 175 via diode 171, indicated by the monotonically increasing function, or signal, C. After a time interval determined by the value of the RC network and the breakdown voltage of the unijunction transistor 181, the unijunction transistor is rendered conductive creating pulse D to the input terminals of inverter logic element 185. The output terminal of inverter logic element 185 is driven low, effecting a set-reset signal; the reset signal being carried via conductor 191 to the other input terminal of inverter logic element 153 to reset the bistable latch and allow the print pulse generator to generate another print pulse in response to a signal A.

The set signal of the set-reset signal is carried via conductor 193 to the input terminal of inverter logic element 251 driving its output terminal high. This in turn drives the output terminal of inverter logic element 253 low. The low signal is carried via conductor 257 to the other input terminal of inverter logic element 251 to latch the bistable latch in its present condition despite the decay of the set-reset signal. In addition, the low signal on the output terminal of inverter logic element 253 effects the signal F which is carried via conductor 259 to the input terminal of inverter logic element 261, driving the output terminal thereof high. The high signal is the signal L, which serves as a continuing desensitize signal that is carried via conductor 263 to continue the signal M on the base 195 of transistor 197.

The high signal on the output terminal of inverter logic element 261, indicated by signal L, also serves as an indexing signal and is carried via conductor 267 to index amplifier 51. The index amplifier 51 amplifies the signal and effects energizing of the index clutch 55 connecting continuously running index motor 53 with the various synchronized asseccories such as the selector switch means 13, bypass deck means 27, spline shaft 89, channel indicator 57 and print head 21.

As the output shaft 268 beings to rotate in response to energization of index clutch 55, wiper arm 95 is moved from its contact 93. Consequently, the presence of the voltage signal from power source 297 via closed bypass switch 25 ceases to be felt, effecting the signal H at the input terminals to the inverter logic elements 261 and 271. This effects a high signal on output terminal of inverter logic element 261; which thereby continues the indexing signal, continuing the rotation of the respective elements connected with the energized index clutch 55; and continues the desensitize signal M to the desensitizer means 33. Movement of carriage 83 and print head 21 is thereby prevented during the time that the indexing operation is continued. Also, the charging of timing capacitor 97, denoted by signal R, is prevented by the presence of signal N on the base 115 of the inhibit transistor 111 in the scan timer means 29. Thus, effectively the signal H continues the signal M even though the signal F will be stopped a few milliseconds later by the timing out of the timer means that is started to timing by the high signal on the output of inverter logic element 271. Specifically, the output terminal of inverter logic element 271 sends its high signal via diode 273 and resistor 275 to start the charging of timing capacitor 279. After a timing interval, unijunction transistor 277 fires to discharge timing capacitor 279, as indicated by signal J. A reset signal K is generated each time the unijunction transistor 277 fires. The signal K is sent through inverter logic element 291 to effect a low via conductor 293 on the input terminal of inverter logic element 253 to reset bistable latch in a condition to receive the set-reset signal from print signal generator means 31. The high at the output terminal of the inverter logic element 253 also terminates the signal F and would terminate the signal L but for the existence of the signal H as a low at the other input terminal to the inverter logic element 261.

When the wiper arm 95 becomes electrically connected with the next contact on channel 3 of the bypass deck means 27, a closed bypass switch 25a will indicate that this channel is to be monitored. Specifically, the closed bypass switch 25a conducts the voltage from power source 297 to the corresponding contact 93 to raise to a high the input terminals on the inverter logic elements 261 and 271. The high on the input terminal of the inverter logic element 261, accompanied by the high signal F on conductor 259 at the other input terminal, terminates both the indexing signal and the continuing desensitize signal, signal L. The high on the input terminal of the inverter logic element 271 drives its output terminal low and prevents charging of timing capacitor 279.

Simultaneously with the movement of wiper arm 95 to the contact 93 on channel 3, the wiper arms 45 and 47 of the selector switch means 13 are moved to the contacts on channel 3 thereof. The measuring means 17 measures the magnitude of the parameter being sensed on channel 3 and sends an error signal to the servo amplifier 63 to try to reposition the carriage 83.

During this time interval, however, the measuring means 17 also senses the value of transients induced by the various switching actions, the disengaging of the index clutch 55 and the like. Consequently, there is a good chance that the error signal transmitted from the measuring means to the servo amplifier 63 would not be the correct value of the parameter being measured. Accordingly, a desensitizing timing means in the desensitizer means continues the signal P that prevents action of the positioning means in repositioning the carriage 83 for a predetermined timed interval, indicated by the signal P, FIG. 3. Moreover, the signal N is continued by the desensitizing timer means beyond the cessation of the desensitize signal M effected by the signal L. This delays the starting of the charging of the timing capacitor in the scan timer means 29. After a sufficient time interval of several tens of milliseconds, the desensitizing timer means effects termination of the signal P and allows the positioning means to respond to the output signal of the measuring means and allows signal R to begin charging of the timing capacitor 97 in the scan timer means 29.

Accordingly, the carriage 83 will position the pointer and the print head at a position corresponding to the magnitude of the parameter being measured on channel 3 and a second print operation is readied upon the expiration of the timing interval and the generation of the signal A to initiate another print and index operation. The same sequence of events described hereinbefore are carried out and the printing and indexing effected.

As the wiper arm 95 is indexed to the next channel $n$, an open bypass switch 25b does not stop the signal H so the continuing desensitize signal and the indexing signal is continued until the contact on the next channel having a closed bypass switch; for example, contact 93 on the channel $n+1$ having closed bypass switch 25c; is encountered. Thus, the n channel is also bypassed by wiper arms 45 and 47 on the selector switch means 13. It is only after the contact 93 on channel $n+1$ is encountered by wiper arm 95, that the signal H is terminated to terminate the continuing desensitize signal and the indexing signal.

As indicated hereinbefore, the specific arrangement of the logic elements and the various voltage levels may be inverted once the principles to be accomplished have been delineated to one skilled in the art. At several points in FIGS. 1 and 2 power sources are shown by respective terminals. The power sources should be compatible with the logic elements employed. In the majority of instances a positive 5 volts will be satisfactory for the logic elements that have been employed in one embodiment of this invention. Additionally, equivalent elements may be employed instead of the various logic elements, field effect transistors, unijunction transistors and the like to still effect the desired miniaturization and reliable operation.

From the foregoing description and drawings, it can be seen that this invention accomplishes the objects and provides a uniquely advantageous combination of electrical, electronic and mechanical means to effect adjustably rapid monitoring and printing of a plurality of values of parameters on a plurality of input channels in response to periodic timed signals with a simple apparatus having a minimum of parts and a consequent high reliability of operation; enabling producing a miniaturized recorder that requires little maintainence. Moreover, this invention provides a multi channel printing recorder that is much faster in operation than the multi channel printing recorders in the prior art and has a rapid bypass capability without waiting for a timing interval for each channel; and, specifically, has bypass switches that may be controlled from a remote position to control the channels being monitored and bypassed. This invention also provides a channel indicator that is remote from the print head and may be positioned so as to be readily visible from a selected position such as the front of the recorder.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. In a multi point recorder including a plurality of input terminals; a selector switch means for monitoring respective said input terminals; indexing means for simultaneously and synchronously moving said selector switch means and indexing a print head; measuring means for measuring the input signal present on the input terminal selected by said selector switch; positioning means connected with said measuring means and with said print head for positioning said print head at a position corresponding to the magnitude of said input signal; the improvement comprising:

a. a plurality of bypass switch means for signalling whether respective input terminals are to be monitored or bypassed;

b. a bypass deck means having a plurality of contacts connected with respective said bypass switch means, an output terminal, and interconnection means for connecting said output terminal with respective ones of said contacts; said interconnection means being connected with said selector switch means so as to track synchronously therewith and connect said contacts with said output terminal in synchronism with said selector switch means connecting a corresponding input terminal;

c. a scan timer means for generating periodic signals, each periodic signal initiating a print operation;

d. print signal generator means connected with said scan timer means for generating in response to respective said periodic signals a desensitize signal; a print signal; and, after a timed interval, a set-reset signal;

e. desensitizer means connected with said print signal generator means and said positioning means for desensitizing and stopping said positioning means in response to a desensitize signal;

f. print means connected with said print signal generating means and operable to effect printing via said print head in response to said print signal;

g. index signal generator means connected with said print signal generator means, with said desensitizer means, and with said indexing means for generating in response to said set-reset signal a continuing desensitize signal and an indexing signal; for transmitting said continuing desensitize signal to said desensitizer means; and for transmitting said indexing signal to said indexing means; said indexing signal effecting indexing of said selector switch and said bypass deck means to the next input terminal that is not to be bypassed; said indexing signal generator means also being connected with the output terminal of said bypass deck means for stopping said indexing and terminating said continuing desensitize signal in response to being connected with a properly positioned bypass switch.

2. The multi point recorder of claim 1 wherein said desensitizer means is also connected with said scan timer means so as to inhibit the beginning of the timing period as long as a desensitize signal is being sent to said desensitizer means.

3. The multi point recorder of claim 1 wherein said print signal generator means contains a reset means that is connected to receive said set-reset signal for preventing generation of another print signal until reset by said set-reset signal.

4. The multi point recorder of claim 1 wherein said desensitizer means contains a desensitizing timer means for continuing the desensitizing and the stopping of said positioning means for a predetermined interval of time after discontinuance of a desensitize signal.

5. The multi point recorder of claim 1 wherein said index signal generator means contains a reset means that is connected internally to receive a reset signal and said index signal generator means contains a timer means for generating said reset signal after the expiration of the predetermined time from the time said interconnection means of said bypass deck means is indexed from the contact corresponding to the channel just printed, whereby acceptance of and response to another set-reset signal is prevented before receiving said reset signal.

6. The multi point recorder of claim 1 wherein said interconnection means comprises a mechanically operable wiper arm that is physically connected with said selector switch to move synchronously therewith.

7. The multi point recorder of claim 1 wherein said plurality of bypass switches are electrical switches that are electrically connected with respective contacts on said bypass deck means, said bypass switches being contained in a separable unit that may be employed remote from the recorder.

* * * * *